United States Patent
Morita

(10) Patent No.: US 10,860,267 B2
(45) Date of Patent: Dec. 8, 2020

(54) INFORMATION PROCESSING APPARATUS THAT SETS PRINT SETTINGS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Keisuke Morita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/434,622

(22) Filed: Jun. 7, 2019

(65) Prior Publication Data

US 2019/0391766 A1 Dec. 26, 2019

(30) Foreign Application Priority Data

Jun. 25, 2018 (JP) ................................ 2018-120041

(51) Int. Cl.
*G06F 3/12* (2006.01)
*G06F 3/01* (2006.01)
*H04N 1/00* (2006.01)

(52) U.S. Cl.
CPC ............. *G06F 3/125* (2013.01); *G06F 3/017* (2013.01); *G06F 3/1205* (2013.01); *G06F 3/1253* (2013.01); *H04N 1/00456* (2013.01); *G06F 2203/04808* (2013.01)

(58) Field of Classification Search
None
See application file for complete search history.

(56) References Cited

U.S. PATENT DOCUMENTS

| 2008/0144087 A1* | 6/2008 | Mitsui | G06F 3/1204 358/1.15 |
| 2013/0238358 A1* | 9/2013 | Yamane | G06F 19/324 705/3 |
| 2014/0146330 A1* | 5/2014 | Miyata | G06F 3/1205 358/1.9 |

FOREIGN PATENT DOCUMENTS

JP 2014068101 A 4/2014

* cited by examiner

*Primary Examiner* — Thomas D Lee
(74) *Attorney, Agent, or Firm* — Rossi, Kimms & McDowell LLP

(57) ABSTRACT

There is provided an information processing apparatus comprising a memory for storing one or more programs and at least one processor that executes the programs. The information processing apparatus functions to set a page count to be printed to one sheet and determines whether an object has moved in a first direction or a second direction that is a reverse direction to the first direction. If the object has moved in the first direction, reset the page count to increase the set page count, and if the object has moved in the second direction, reset the set page count to decrease the set page count. The information processing apparatus determines whether a conflict relationship is occurring between the reset page count and another print setting, and changes the another print setting if the conflict relationship is occurring.

12 Claims, 15 Drawing Sheets

FIG. 4

| BASICS | LAYOUT | FEEDING | FINISH | PRINT QUALITY | FRONT COVER | SUPPORT/DEVICE | ✕ |

ORIGINAL SIZE: | A1 | ▽ | DETAIL... |
OUTPUT SHEET SIZE: | SAME AS ORIGINAL SIZE | ▽ |
SHEET TYPE: | PLAIN PAPER | ▽ |
PRINT ORIENTATION: | PORTRAIT |
NUMBER OF COPIES: | 1 | COPIES (1~9999) |
DUPLEX PRINTING

BINDING DIRECTION: | 📄 PORTRAIT | ▽ | DETAIL... |
BOOKBIND PRINTING
PAGE AGGREGATION | 2 | 2 in 1 |
STAPLE | ☐ NO |
COLOR MODE | ☐ TOP LEFT (ONE LOCATION) |
OUTPUT METHOD | COLOR | ▽ | DETAIL... |
 | 🖨 PRINT |

FAVORITE
📄 2 in 1 (SIMPLEX)
📄 2 in 1 (DUPLEX)
📄 DUPLEX
📄 CONFIDENTIAL

REGISTER
RETURN PRINT SETTINGS TO STANDARD

OK | CANCEL | HELP

401

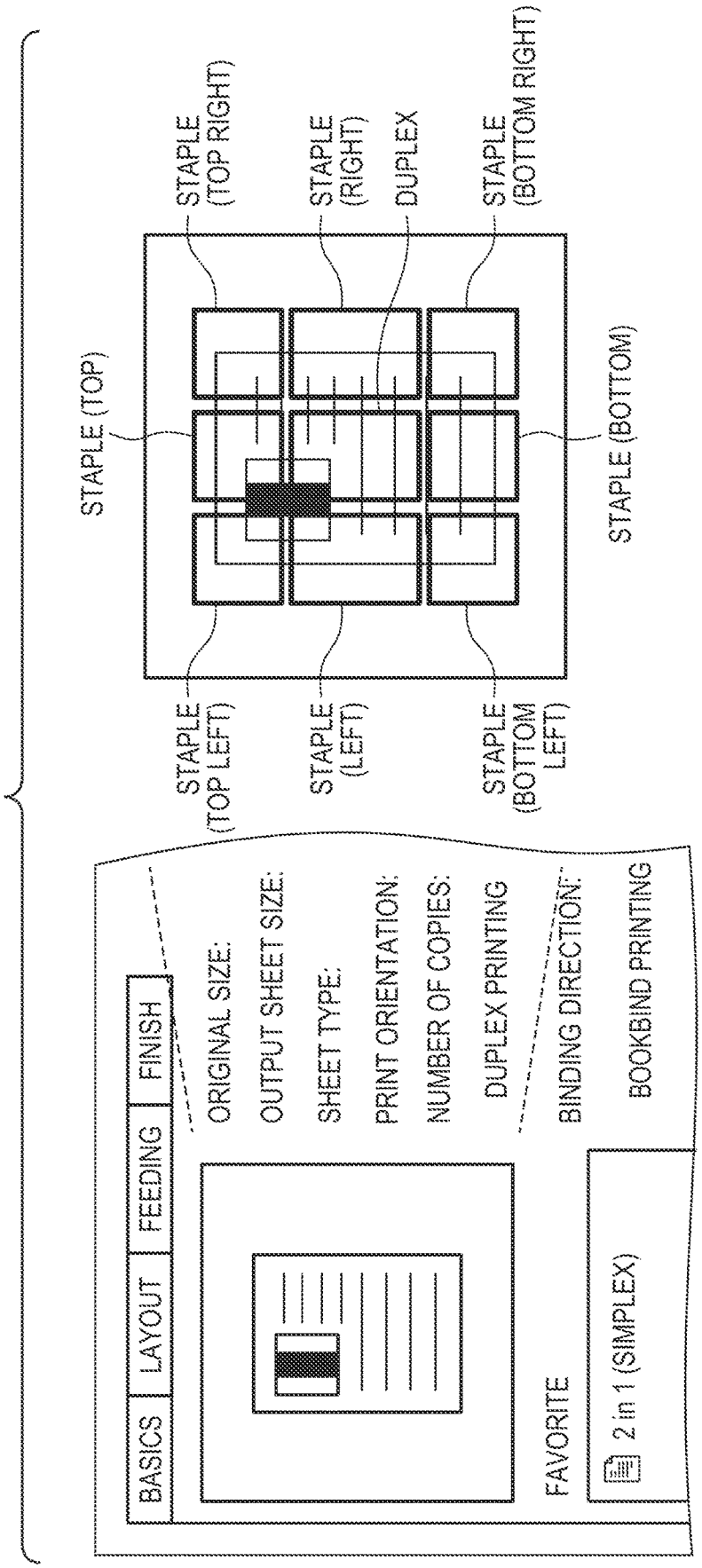

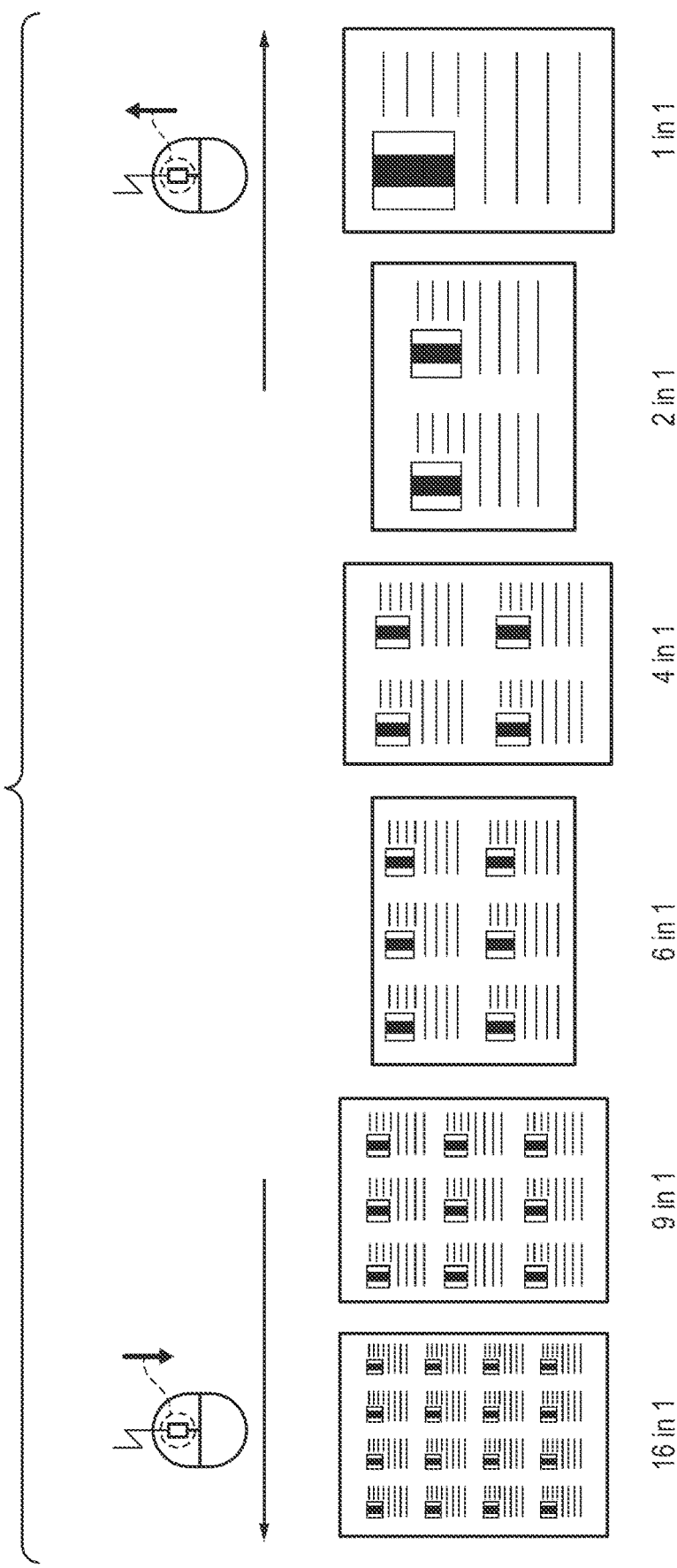

FIG. 8A

```xml
<?xml version="1.0" encoding="utf-8"?>
<pv:PreviewSettings xmlns:pv="http://www.ganon.com/ns/preview/2006/11">
    <pv:OperationSetting Area="All" Operation="Scaling">
        <pv:StatusVariable name="PagesPerSheet">
            <pv:Target value="1"/>
            <pv:Target value="2"/>
            <pv:Target value="4"/>
        </pv:StatusVariable>
    </pv:OperationSetting>
</pv:PreviewSettings>
```
~801

FIG. 8B

```xml
<?xml version="1.0" encoding="utf-8"?>
<pv:PreviewSettings xmlns:pv="http://www.ganon.com/ns/preview/2006/11">
    <pv:OperationSetting Area="All" Operation="Scaling">
        <pv:StatusVariable name="PagesPerSheet">
            <pv:Exclude value="6"/>
            <pv:Exclude value="9"/>
            <pv:Exclude value="16"/>
        </pv:StatusVariable>
    </pv:OperationSetting>
</pv:PreviewSettings>
```
~802

FIG. 8C

```xml
<?xml version="1.0" encoding="utf-8"?>
<pv:PreviewSettings xmlns:pv="http://www.ganon.com/ns/preview/2006/11">
    <pv:OperationSetting Area="All" Operation="Scaling">
        <pv:StatusVariable name="PagesPerSheet">
            <pv:Exclude Range="Min" value="6"/>
            <pv:Exclude Range="Max" value="16"/>
        </pv:StatusVariable>
    </pv:OperationSetting>
</pv:PreviewSettings>
```
~803

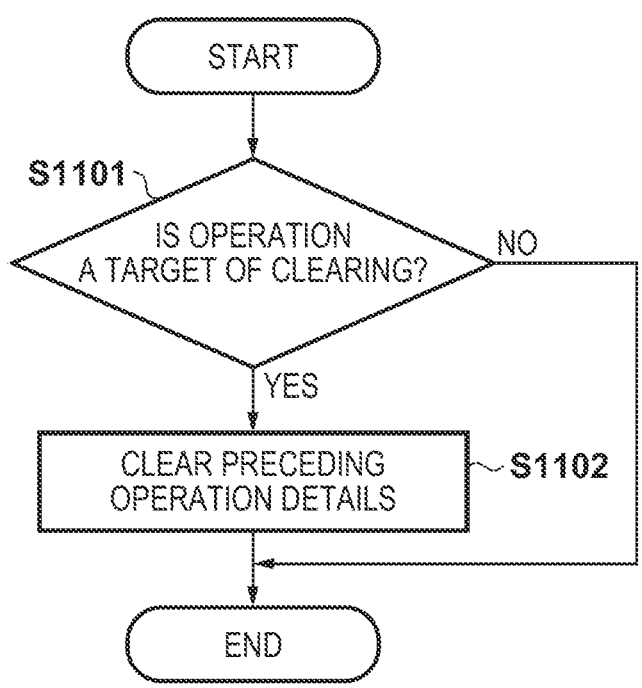

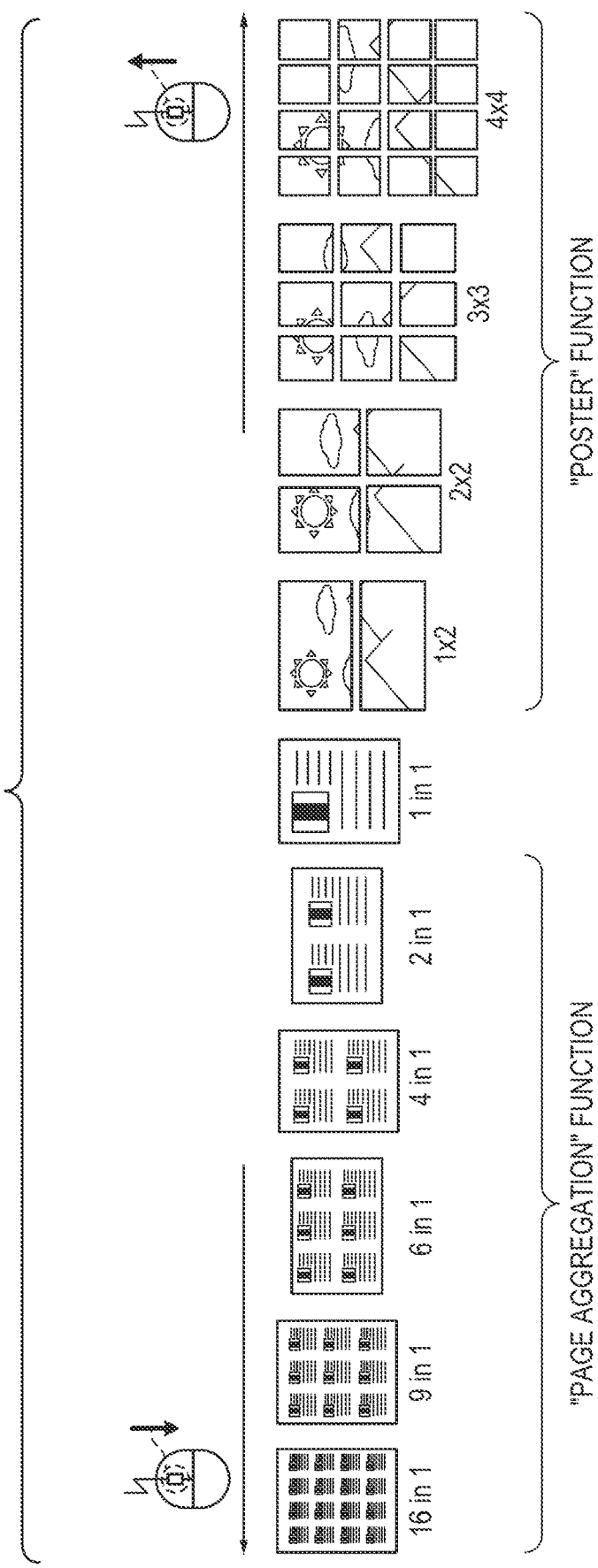

FIG. 13A

```xml
<?xml version="1.0" encoding="utf-8"?>
<cg:CustomGesture xmlns:cg="http://www.ganon.com/ns/gesture/2006/09">
    <cg:TargetFeatures>
                                                                                    1301
        <Feature="PagesPerSheet" Value="16" />
        <Feature="PagesPerSheet" Value="9" />
        <Feature="PagesPerSheet" Value="6" />
        <Feature="PagesPerSheet" Value="4" />
        <Feature="PagesPerSheet" Value="2" />
        <Feature="PagesPerSheet" Value="1" />

<Feature="PagePosterPrint" Value="Poster1x2" />
        <Feature="PagePosterPrint" Value="Poster2x2" />
        <Feature="PagePosterPrint" Value="Poster3x3" />
        <Feature="PagePosterPrint" Value="Poster4x4" />
                                                                                    1302
    </cg:TargetFeatures>
</cg:CustomGesture>
```

FIG. 13B

```xml
<?xml version="1.0" encoding="utf-8"?>
<cg:CustomGesture xmlns:cg="http://www.ganon.com/ns/gesture/2006/09">
    <cg:TargetFeatures>

<Feature="PagesPerSheet" Value="2">
            <Feature="PageOrientation" Value="Landscape" />
            <Feature="PagePosterPrint" Value="Poster1x1" />
        </Feature>                                                                  1303
        <Feature="PagesPerSheet" Value="1">
            <Feature="PageOrientation" Value="Portrait" />
            <Feature="PagePosterPrint" Value="Poster1x1" />
        </Feature>
```

INFORMATION PROCESSING APPARATUS THAT SETS PRINT SETTINGS, METHOD OF CONTROLLING THE SAME, AND NON-TRANSITORY COMPUTER-READABLE STORAGE MEDIUM

BACKGROUND OF THE INVENTION

Field of the Invention

The present invention relates to an information processing apparatus that instructs printing with respect to a printing apparatus, a control method, and a non-transitory computer-readable storage medium.

Description of the Related Art

Conventionally, displaying a schematic drawing (an illustration) indicating the appearance in which a print material will be outputted, based on a current print setting, in a predetermined region (a preview region) on a screen (a print setting screen) for the print setting which is provided by, for example, a printer driver for instructing printing to a printing apparatus is known. For example, if N-in-one printing for aggregating images for two pages on one sheet via a print setting screen is set, an illustration in which two pages are aggregated on one sheet will also be displayed in the preview region on the print setting screen.

In addition, dynamically changing a print setting and the illustration in accordance with a clicked position if a click operation via an input device such as a mouse is performed with respect to the region (the preview region) in which the illustration is being displayed is known. For example, if the top-left of the preview region is clicked, it is possible to change to a print setting for binding the top-left of a print material by a staple, and switch the display to an illustration that indicates that the top-left is bound by a staple for the preview region.

In addition, in recent years, a method for displaying a preview by using image data used in printing before performing print processing such as copying in a printing apparatus has been proposed. Japanese Patent Laid-Open No. 2014-068101 discloses a printing apparatus that can display a thumbnail image of image data, which is used in printing, on a touch panel that the printing apparatus has. In this printing apparatus, it is possible to change a display magnification of the image when a pinch-in or a pinch-out operation is performed on a thumbnail image displayed on the touch panel. In addition, switching to a display of a thumbnail image for aggregated printing (for example, 2in1 printing) when the image is shrunk to a certain size (for example, 70%) or less based on the operation is disclosed.

Incidentally, in recent years, computers such as a tablet terminal on which it is possible to perform a touch operation have been increasing even in regard to a computer that a user possesses and that use a printing apparatus. In such an information processing apparatus, convenience increases for the user when it is possible to change a print setting by a touch operation such as a pinch-in or a pinch-out. However, a conventional print setting screen is made assuming that a print setting is set using a click operation of a mouse, and there has been no consideration to changing a print setting by applying an operation such as a pinch-in or a pinch-out, a wheel operation of a mouse, or the like.

SUMMARY OF THE INVENTION

An aspect of the present invention is to eliminate the above-mentioned problem with conventional technology.

The feature of the present invention is to provide a technique that, when setting a print setting by an information processing apparatus that instructs printing to a printing apparatus, enables the print setting to be set intuitively by a user operation, and enables the change of the print setting to be intuitively conveyed to a user.

One aspect of the present invention provides an information processing apparatus comprising: a memory for storing one or more programs; and at least one processor that executes the one or more programs to function as: a setting unit configured to set a number of pages to be printed to one sheet; a first determination unit configured to determine whether an object has moved in a first direction or moved in a second direction that is a reverse direction to the first direction; a re-setting unit configured to, if the first determination unit determines that the object has moved in the first direction, reset the set number of pages to increase the set number of pages, and if the first determination unit determines that the object has moved in the second direction, reset the set number of pages to decrease the set number of pages; a second determination unit configured to determine whether a conflict relationship is occurring between the number of pages reset by a re-setting unit, and another print setting; and a change unit configured to change the another print setting if the second determination unit determines that a conflict relationship is occurring.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view illustrating an example of a UI of a print setting screen, according to the embodiment.

FIG. 5 is a view illustrating an example of a preview region of a print setting screen, according to the embodiment.

FIG. 6 is a view illustrating an example of a plurality of setting values that can be changed in accordance with an operation corresponding to a direction component in a preview region, according to the embodiment.

FIGS. 8A to 8C are views illustrating details of definitions for designating a setting target of a setting item or a setting value, according to an embodiment.

FIG. 11 is a flow diagram illustrating an example of processing for clearing change content of a print setting, according to an embodiment.

FIG. 12 is a view illustrating an example of a plurality of setting items and a plurality of setting values that can be changed in accordance with an operation corresponding to a direction component in a preview region, according to the embodiment.

FIGS. 13A and 13B are views illustrating details of definitions for designating a plurality of setting item or setting value targets, according to an embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

A first embodiment provides a user interface (UI) for changing a print setting by an information processing apparatus that instructions printing with respect to a printing apparatus. In more detail, the present embodiment relates to an information processing apparatus that can change a print setting in accordance with an operation corresponding to a direction component in a preview region on the UI (a display unit).

Figure 1:
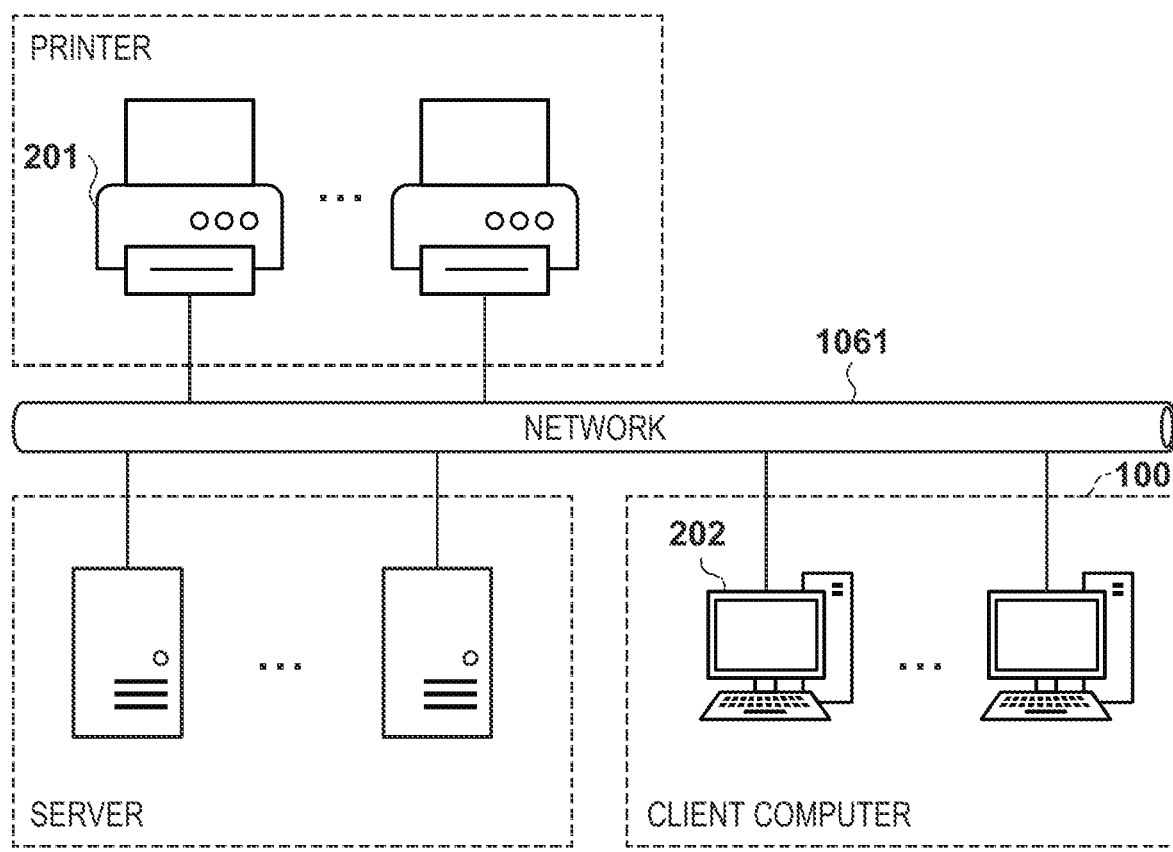
FIG. 1 is a view illustrating an example of a network that includes an information processing apparatus according to an embodiment.

Firstly, with reference to FIG. 1, description is given regarding a network 1061 to which an information processing apparatus according to the present embodiment is connected. A printer 201, computers 100 and 202, and optionally a server are connected to the network 1061. The printer 201 is a printing apparatus that accepts a print instruction from another apparatus on the network 1061. In an example, the printer 201 comprises an image processing apparatus (an MFP) that is capable of scan and fax functions.

The computers 100 and 202 are information processing apparatuses that are operated by a user and are for creating a document or image for printing. Note that the printer 201 may be a cloud printer that is not directly connected to the network 1061 and communicates with the computer 100 or 202 via the Internet. The network 1061 is a small-scale wired network or wireless network such as a PAN (Personal Area Network) or a LAN, or a large-scale network.

Figure 2:
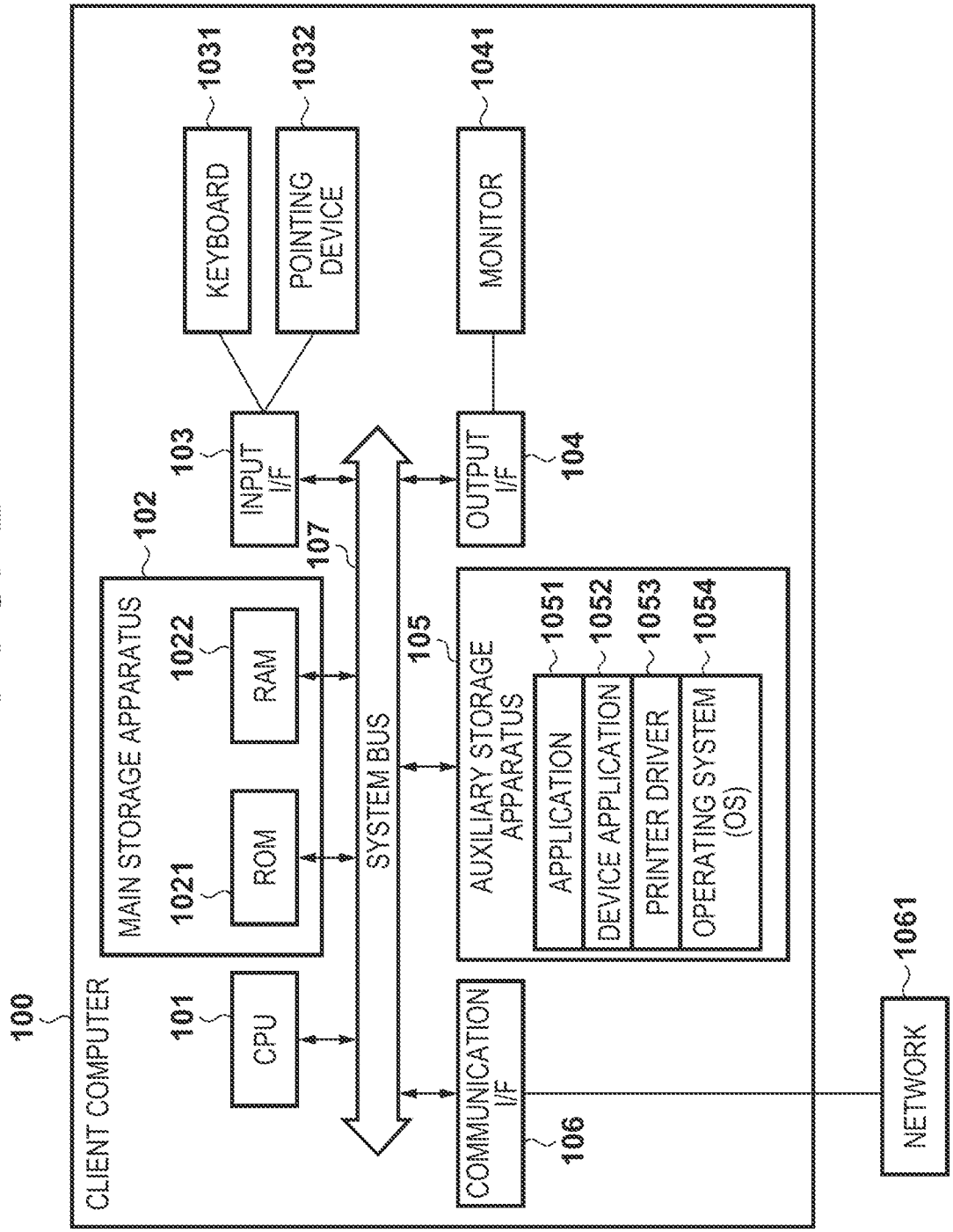
FIG. 2 is a block diagram of hardware and software of the information processing apparatus according to the embodiment.

Next, with reference to FIG. 2, description is given for hardware and software of the computer 100 according to the first embodiment. The computer 100 according to the present embodiment can include a CPU (Central Processing Unit) 101, a main storage apparatus 102, an input I/F 103, an output I/F 104, an auxiliary storage apparatus 105, and a communication I/F 106. These components are connected to a system bus 107, and it is possible to exchange data between modules.

The CPU 101 controls the entirety of the computer 100 by executing a program stored in a ROM (Read Only Memory) 1021 or a RAM (Random Access Memory) 1022 of the main storage apparatus 102, or the auxiliary storage apparatus 105. The RAM 1022 is used as a work area when the CPU 101 performs processing.

Stored in the auxiliary storage apparatus 105 are various programs (referred to as programs 1051 to 1054) such as an application 1051, a device application 1052, a printer driver 1053, and an operating system (OS) 1054. Input devices such as a keyboard 1031 and a pointing device 1032 which is typified as a mouse, a touch panel, or a touch pad, are connected to the computer 100 through the input interface (I/F) 103. The CPU 101 accepts an operation from a user with respect to a program, through these input devices. An output device such as a monitor 1041 is connected to the output I/F 104, and is controlled by a program that the CPU 101 executes to display a UI. Note that the pointing device 1032 and the monitor 1041 may be integrated as in a smart phone, a tablet terminal, or the like. In addition, the keyboard 1031 may be a software keyboard that is realized by software and the pointing device 1032.

The communication I/F 106 is connected to the network 1061, and is an interface for performing communication with a device external to the computer 100, for example the computer 202 or the printer 201 of FIG. 1.

In addition, configuration may be such that the programs 1051 to 1054 can be added to the auxiliary storage apparatus 105 via a CD-ROM or a USB memory (not shown). Furthermore, it is possible for them to be added to the auxiliary storage apparatus 105 via the network 1061.

Note that, unless otherwise specified, if it is possible to realize functions of according to the present embodiment described below, it is possible to apply the present invention irrespective of the configuration illustrated in FIG. 2. In addition, while the computer 100 of the present embodiment is described as a single device, it may be a system that comprises a plurality of devices, and may be a system that executes processing in cooperation with a server connected via the network of FIG. 2, for example.

The application 1051 is an application such as word processor or a browser, and displays a UI on the monitor 1041 in cooperation with the OS 1054. In addition, the application 1051 accepts a print request from a user in accordance with an input device such as the pointing device 1032 or the keyboard 1031. Receiving the print request from the user, the application 1051 transmits the print request and print data to a print system (not shown) which is a subsystem of the OS 1054.

The print system is positioned between the application 1051 and the printer driver 1053, and executes common processing in print processing. As specific execution processing, a selection of a printer to transmit the print request to, and a conversion to PDL (Page Description Language) 301 using the selected printer driver 1053 are performed. The printer driver 1053 is a module that handles processing that depends on the printer which is the transmission destination of the print request.

Figure 3:
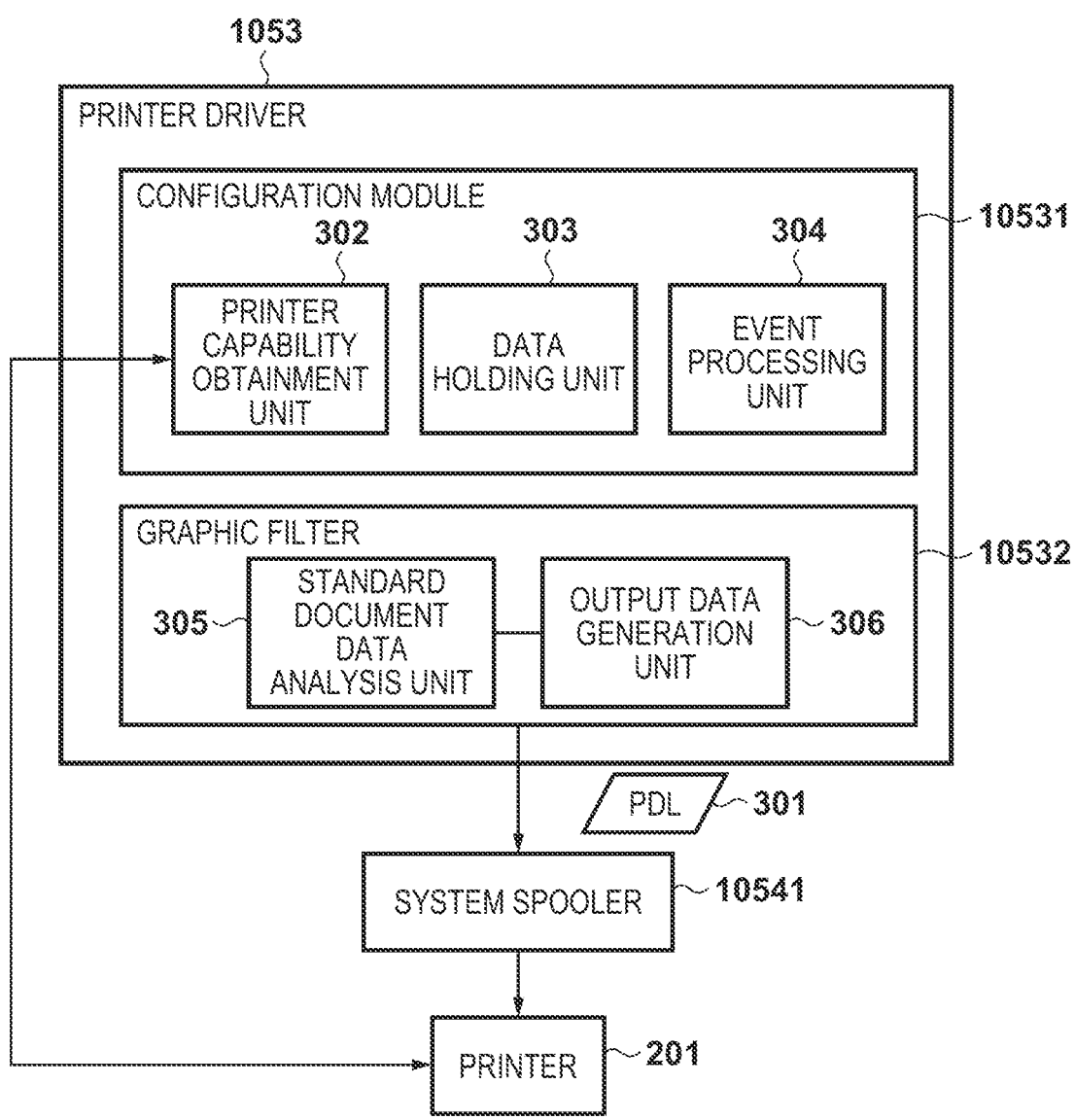
FIG. 3 is a view illustrating an example of a printer driver according to the embodiment.

Next, with reference to FIG. 3, description is given for detail of the printer driver 1053. The printer driver 1053 comprises a configuration module 10531 and a graphic filter 10532 which are software modules. These software modules are loaded from the auxiliary storage apparatus 105 into the RAM 1022, and are executed by the CPU 101.

The configuration module 10531 has a printer capability obtainment unit 302, a data holding unit 303, and an event processing unit 304. The printer capability obtainment unit 302 obtains device configuration information the printer 201 to which the computer 100 could transmit the print request, information set in advance by a user, and the like. The data holding unit 303 stores data used by the printer driver 1053. In an example, the data holding unit 303 can be realized by at least one of the RAM 1022 and a file system and a registry in the auxiliary storage apparatus 105. The event processing unit 304 can display a tooltip such as a widget or a speech bubble on the UI, with respect to a processing request generated from the OS 1054 in relation to an operation of the keyboard 1031 or the pointing device 1032.

The graphic filter 10532 accepts, from the application 1051, standard document data that includes setting information that a printer can typically interpret, and performs analysis by a standard document data analysis unit 305. An output data generation unit 306 is then used to make a conversion to a PDL (output data) 301 that can be interpreted by the printer 201. Note that, in the present specification, it is assumed that the output data includes a print setting and print data that the printer 201 uses for printing. The PDL 301 resulting from the conversion is transmitted to a system spooler 10541 which is a sub-system of the OS 1054, and is then transmitted to the printer 201.

Next, with reference to FIG. 4, description is given regarding a UI of a print setting screen according to the present embodiment. FIG. 4 is an example that illustrates a print setting screen which is a UI of the printer driver 1053, and a user can change a setting item needed for printing, such as duplex printing or N-in-one printing, via this print setting screen. As illustrated by FIG. 4, the print setting screen according to the present embodiment includes a preview region 401 that enables a user to visually understand a print setting.

Print settings are assumed to include setting items including: "N-in-one printing" which includes a setting value such as "1in1" or "2in1", "poster print" which includes a setting value such as "1×1" or "1×2", "duplex printing", and "stapling" which includes a setting value such as "top left" or "top right". In other words, all setting items that can be changed on the print setting screen are included in print settings. In addition, in the present specification, a value for each setting item, such as "1in1", is referred to as a "setting value". In addition, in the present specification, a combination of setting items that cannot be active simultaneously, "N-in-one printing" and "poster print", is referred to as a "prohibited" combination of setting items. For example, a combination of "N-in-one printing" and "duplex printing" is not prohibited, but "poster print" and "duplex printing" corresponds to a prohibited combination of setting items. Note that information indicating whether a combination of setting items is prohibited (conflict information) can be obtained via the data holding unit 303 or the printer capability obtainment unit 302.

The preview region 401 visually represents what kind of print settings are set for a document to be printed. For example, when a setting value for the orientation of printing is switched from portrait to landscape, the image of the preview region 401 also becomes a landscape display, and when a setting value for a color mode is switched from color to monochrome, the illustration of the preview region 401 also changes from color to black and white. In other words, when any setting value changes in the print setting screen, this is reflected to the preview region 401. In addition, by clicking on the preview region 401, it is possible to change a setting value corresponding to a clicked location.

In the present embodiment, in accordance with a click operation on the preview region 401 illustrated in FIG. 5, it is possible to change a setting value corresponding to a clicked location. For example, when a top-left region of the preview region 401 is clicked, a setting value for the setting item "staple" is changed to "top left", and when a center region of the preview region 401 is clicked, the setting item "duplex setting" switches between the setting values "active" and "inactive".

In addition, in the present embodiment, it is possible to change a setting value upon the preview region 401 accepting an operation (a direction operation) corresponding to a direction component in the preview region 401. More specifically, it is possible to change a predetermined setting value when a rotation operation of a mouse wheel (a wheel operation) or a pinch-in/pinch-out operation via a touch panel, a touch pad or the like (a pinch operation) is performed. Note that, in the present embodiment, while an operation corresponding to a direction component in the preview region is described as a wheel operation or a pinch operation, it may be a swipe by one finger or a swipe by two fingers, for example. However, it does not include an operation that comprises only information relating to an input position, such as a click. In other words, an operation corresponding to a direction component in the preview region comprises a positive or negative rotation of a wheel (a wheel-up or a wheel-down), a pinch (enlargement or reduction), and a movement direction, a drag-and-drop, or swipe of a finger, for example, apart from a click operation. In an example, an operation corresponding to a direction component in the preview region may be a press of one out of a pair of keys that comprise direction keys. In addition, the illustration displayed on the preview region updates accompanying the operation. By this, it is possible to increase a number of setting items for which it is possible to change a setting value without impairing an intuitive operation feeling, in comparison to a case of only click operations.

Next, with reference to FIG. 6, description is given for an example of a setting item for which it is possible to change a setting value in accordance with an operation corresponding to a direction component in the preview region. As shown in the figure, for the setting value for N-in-one printing, a number of aggregated pages is caused to increase as in "1in1"→"2in1"→"4in1" by a reduction operation (a wheel-down), and the number of aggregated pages is caused to decrease as in "4in1"→"2in1" "1in1" by an enlargement operation (a wheel-up). Note that, in the present specification, changing the N-in-one setting from "2in1" to "4in1" is represented as causing the number of aggregated pages to increase by one level, and changing the N-in-one setting from "4in1" to "2in1" is represented as causing the number of aggregated pages to decrease by one level. In addition, in the present embodiment, when the setting value for N-in-one printing is "1in1", it is assumed that a further enlargement operation is not accepted, but, in an example, when the number of aggregated pages continues to be caused to decrease by an enlargement operation, a change may be made to a setting value for the maximum number of aggregated pages, as with "1in1"→"16in1". As a result, it is possible to select any setting value for N-in-one printing setting item by only an enlargement operation.

Figure 7:
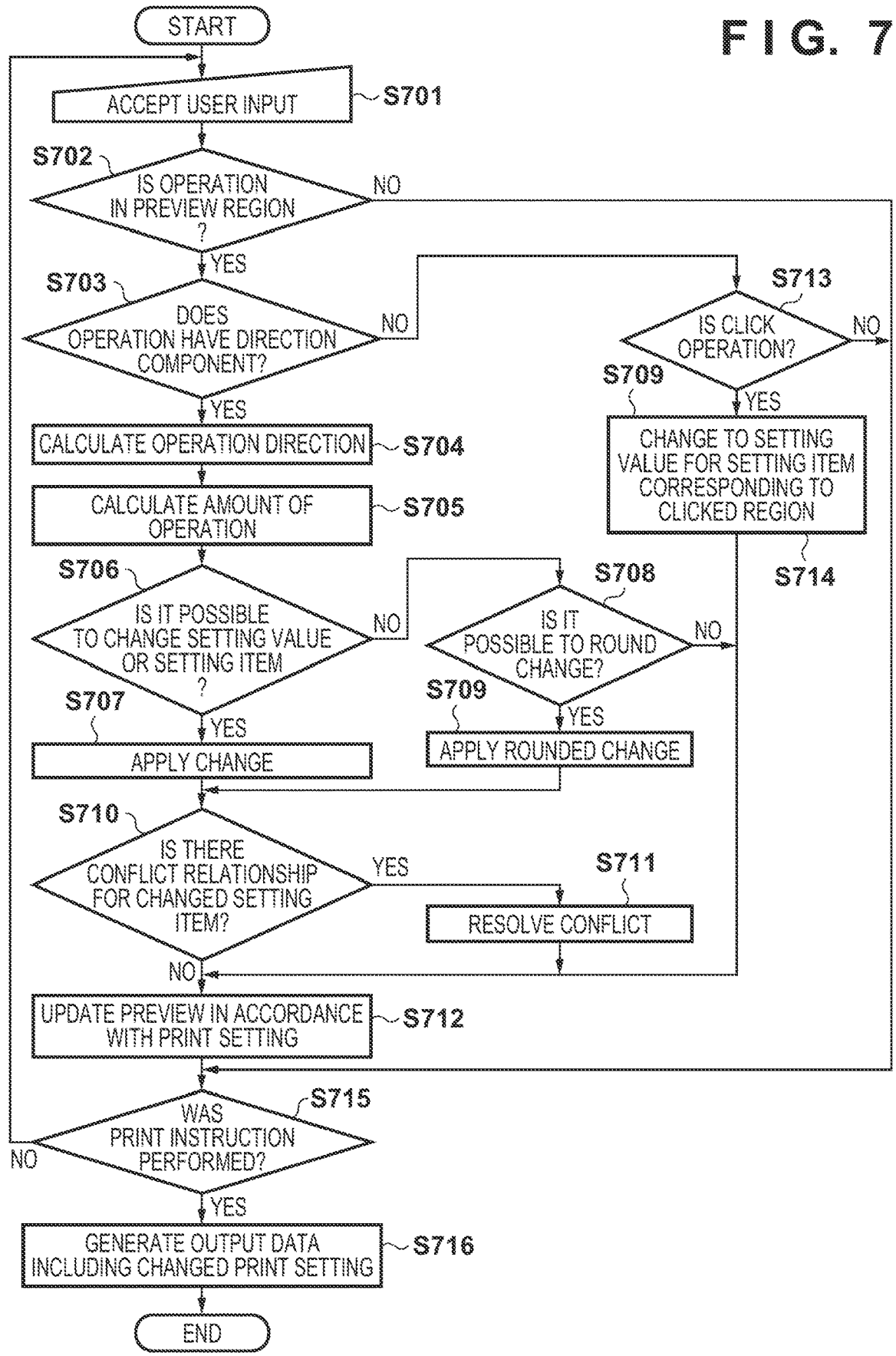
FIG. 7 is a flowchart illustrating an example of processing for changing a plurality of setting values that can be changed in accordance with an operation corresponding to a direction component in a preview region, according to the embodiment.

Next, with reference to FIG. 7, description is given for an example of processing for changing a setting value in accordance with an operation corresponding to a direction component in the preview region 401 of the print setting screen. Note that it is assumed that the processing flow of FIG. 7 is executed by the configuration module 10531 of the printer driver 1053 unless otherwise specified.

Firstly, in step S701, the configuration module 10531 detects input accepted from a user via the event processing unit 304. This indicates input processing by the pointing device 1032 in particular.

Next, the configuration module 10531 advances the processing to step S702, and determines whether an input operation from the user that was detected in step S701 is being performed on the preview region 401 of the print setting screen. If an input operation is being performed on the preview region 401 (YES in step S702), the configuration module 10531 advances the processing to step S703, and if it is being performed somewhere other than the preview region 401 (NO in step S702), the processing ends. Note that, configuration may be taken to, if an input operation is being performed on a plurality of locations such as with multi-touch, determine whether a centroid portion of the input locations is inside the preview region 401 or determine whether one of the input locations is inside the preview region 401. In addition, configuration may be taken to, if an input location moves during an input operation such as with a pinch operation, set a starting point of the input operation as a target of the determination, or dynamically determine whether the position at that point in time of the moving input location is inside the preview region 401.

In step S703, the configuration module 10531 determines whether the input operation from the user is an operation corresponding to a direction component in the preview region 401. If the input operation from the user is an operation corresponding to a direction component in the preview region 401 (YES in step S703), the configuration module 10531 advances the processing to step S704. If the input operation from the user is not an operation corresponding to a direction component in the preview region (NO in step S703), the configuration module 10531 advances the processing to step S713. In the present embodiment, the configuration module 10531 determines, in step S703, whether the input operation from a user is a wheel operation or a pinch operation. In the present embodiment, the OS 1054 is Windows (registered trademark), and if a pinch operation is performed with respect to a touch panel, a wheel event such as WM_MOUSEWHEEL or Manipulation is notified to an application. Accordingly, it is possible to determine whether a wheel operation or a pinch operation has been performed based on a message of a wheel event (WM_MOUSEWHEEL or Manipulation) issued by the OS 1054 and the device driver of the pointing device 1032. In another example, configuration may be taken to, if one of a message that differs between a wheel operation and a pinch operation is notified to an application and the message is received, determine whether the input operation from the user is a wheel operation or a pinch operation.

Note that the printer driver 1053 which provides the print setting screen may determine whether there is a pinch operation by obtaining positions of an input operation on a plurality of locations, such as multi-touch, and then calculating a distance between respective input locations. In such a case, for calculation of an amount of operation in step S705 which is described later, the amount of operation may be decided based on a movement amount of input locations for a pinch-in or a pinch-out.

In step S713, the configuration module 10531 determines whether the accepted operation is a click operation. If it is determined to be a click operation (Yes in step S713), the configuration module 10531 advances the processing to step S714, changes to a setting value in accordance with the example illustrated in FIG. 5, and then advances the processing to step S712. In this case, depending on the setting item, a different illustration to that of FIG. 5, such as for a poster or bookbinding, is displayed, but even in this case, a print setting can be changed in accordance with a setting value and the setting item assigned to a click operation and corresponding to the displayed illustration. For example, if a poster is displayed in the preview region 401, a poster setting does not permit duplex printing. Accordingly, configuration may be taken such that, if the center of the preview region 401 is clicked, a setting value for a setting item different to duplex printing (for example, a color mode) is changed. Similarly, configuration may be taken such that, if a setting item where stapling cannot be performed due to a conflict (for example, a poster print) is active, not change a setting value for stapling if, for example, the top-left of the preview region is clicked. If it is determined that the accepted operation is not a click operation (No in step S713), the configuration module advances the processing to step S715.

In step S704, the configuration module 10531 calculates a direction (an operation direction) of the wheel operation. For example, a wheel direction may be determined by whether a value that represents the wheel operation by a numerical value (an amount of operation) is a positive or negative value, as with WM_MOUSEWHEEL. Alternatively, the wheel direction may be determined based on a constant that defines a wheel orientation by "up" or "down" or a constant that defines whether there is a wheel-up by "true" or "false".

Next, the configuration module 10531 advances the processing to step S705, and calculates the amount of operation. In step S705, the configuration module 10531 calculates by how many levels the setting value has changed, based on the amount of operation. For example, if an amount of operation necessary to change the setting value by one level is "120", and the amount of operation that the configuration module 10531 received from the OS 1054 or the device application 1052 indicates "240", it may be determined that an operation for two levels has been performed.

Next, the configuration module 10531 advances the processing to step S706, and determines whether the change calculated in step S704 and step S705 can be applied to the setting value. In the present embodiment, the setting item that is a target of change is N-in-one printing and is saved in advance in the data holding unit 303. When the print setting screen is read, the print setting is obtained via the printer capability obtainment unit 302. A case where it is not possible to apply the change of the setting value includes a case where N-in-one printing cannot be activated due to a conflict relationship with another setting item, for example. In addition, configuration may be taken to determine that the setting value cannot be changed even if the configuration module 10531 receives a wheel operation to further raise or lower the level irrespective of N-in-one printing having reached an upper limit or a lower limit (1in1 or 16in1), respectively.

Note that, in an example, a setting item may be changed instead of a setting value. For example, the setting item may be changed from "N-in-one printing" to "poster print". Details of processing for changing a setting item are described in detail in a fourth embodiment.

If it is possible to change the setting value (YES in step S706), the configuration module 10531 advances the processing to step S707, and applies the change for the N-in-one printing setting value. Here, the configuration module 10531 changes the setting value to generate a print setting, and also updates the illustration displayed in the preview region 401 to an illustration that corresponds to the print setting after the change.

In contrast, if it is not possible to change the setting value (NO in step S706), the configuration module 10531 advances the processing to step S708, and determines whether the inputted change can be rounded to a range where it is possible to change the setting value. For example, if the current setting value for N-in-one printing is "9in1" and a wheel operation for causing the number of aggregated pages to increase by two levels is received, it is not possible to change to a number of aggregated pages that exceeds "16in1". Accordingly, the configuration module 10531 determines to round the wheel operation which is for two levels to an operation for one level. In contrast, if the N-in-one printing setting value is "16in1" and a wheel operation for causing the number of aggregated pages to increase is received, because it is not possible to change to a number of aggregated pages greater than "16in1", the configuration module 10531 determines to not apply a change to the setting value. If rounding of a change to the setting value is possible (YES in step S708), the configuration module 10531 advances the processing to step S709, and applies rounded the change for N-in-one printing. If it is not possible to round the N-in-one printing setting value (NO in step S708), the configuration module 10531 advances the processing to step S712.

In step S710, the configuration module 10531 determines, in accordance with the change of the setting value or the setting item, whether there is a conflict relationship with another setting item. If there is a conflict relationship (YES in step S710), the configuration module 10531 advances the processing to step S711, and resolves (adjusts) the conflict relationship. If a conflict has not occurred (NO in step S710), the configuration module 10531 advances the processing to step S712. Note that the resolution of the conflict relationship executed in step S711 may be the configuration module 10531 independently performing a determination with reference to a conflict rule, and may be executed by calling validate processing that is performed by the OS 1054. In an example, the conflict relationship can be adjusted by deactivating (eliminating) a setting item that is in a conflict relationship with the setting item whose setting value was changed.

Next, in step S712, the configuration module 10531 updates the preview region 401 in accordance with the changed print setting, and advances the processing to step S715.

In step S715, the configuration module 10531 finalizes the print setting, and determines whether an instruction for transmitting a print request has been accepted from a user. Note that this processing may be executed by the configuration module 10531, the OS 1054, or the application 1051 that is being executed, such as Word or Excel. If a print instruction has been performed (Yes in step S715), the configuration module 10531 advances the processing to step S716, and if a print instruction has not been performed (No in step S715), the processing returns to step S701 to accept input from a user.

In step S716, the graphic filter 10532, which has accepted an instruction from the configuration module 10531, the OS 1054, or the application 1051, generates, based on print data and the print setting, output data that includes a print setting that can be interpreted by the printer that will receive the output data. The print setting included in the output data may be an XML format print setting that is structured by Print-Ticket or the like, and may be a print setting represented by a program structure as with DevMode.

As described above, in the first embodiment, change of a print setting is performed based on an operation corresponding to a direction component in the preview region 401. By this, when performing a print setting on an information processing apparatus that instructs printing to a printing apparatus, it is possible to perform the print setting by an intuitive user operation.

Second Embodiment

In the first embodiment, it is possible to change a print setting in accordance with an operation corresponding to a direction component in the preview region 401 of the print setting screen. In an example, if one setting item that has many setting values is changed by an operation corresponding to a direction component in the preview region, effort may be incurred to change to a setting value or a setting item that has a high frequency of use. In the second embodiment, description is given of an example of an information processing apparatus that can reduce an amount of operation for changing to a print setting with a high frequency of use, by limiting a setting value or a setting item that can be changed by an operation corresponding to a direction component. Note that the description of the same structure or processing as in the first embodiment will be omitted.

In the present embodiment, it is assumed that there is a low frequency of use for the setting values "6in1", "9in1", and "16in1" of the setting item "N-in-one printing", and there is a high frequency of use for the setting values "1in1", "2in1", and "4in1".

With reference to FIGS. 8A to 8C, description is given for details of definitions for designating a setting item or a setting value that can be set. FIG. 8A is an example of an XML format definition for adding a specific setting item or setting value to a setting target. The first line of the definition 801 indicates that a setting range (Area) can be all (All) of the preview region 401, and that an operation (Operation) targets processing (Scaling) that is an enlargement/reduction type, including a wheel operation. The second line indicates that a settable setting item is "N-in-one printing" (PagesPerSheet). The third to fifth lines indicate that a setting value (value) that is included in a setting target of change (Target) is "1", "2" and "4". This means that a settable setting value is "1in1", "2in1", and "4in1".

FIG. 8B is an example of an XML format definition for excluding a specific print setting from a setting target. The first and second lines of the definition 802 are similar to those of the definition 801, and thus description thereof is omitted. The third to fifth lines of the definition 802 mean that setting values (value) to exclude (Exclude) from a setting target are "6", "9", and "16", in other words that the setting values to exclude from a setting target are "6in1", "9in1", and "16in1".

FIG. 8C is an example of an XML format definition for excluding setting values of a specific range from a setting target. The first and second lines of the definition 803 are similar to those of the definition 801, and thus description thereof is omitted. The third and fourth lines of the definition 803 designate a minimum value and a maximum value for setting values to exclude (Exclude) from a setting target, to thereby have everything excluded from within this range. Specifically, "6" is designated as a minimum value (Min) of setting values to exclude from the setting target by the third line, and "16" is designated as a maximum value (Max) of setting values to exclude from setting values of the fourth line. Accordingly, the setting values of "6in1" through "16in1" of the setting item "N-in-one printing" are excluded from setting targets.

Note that, in the present embodiment, data relating to designation of these print settings is saved in the data holding unit 303, and is obtained/set by the printer driver 1053 when the print setting screen is read.

Figure 9:
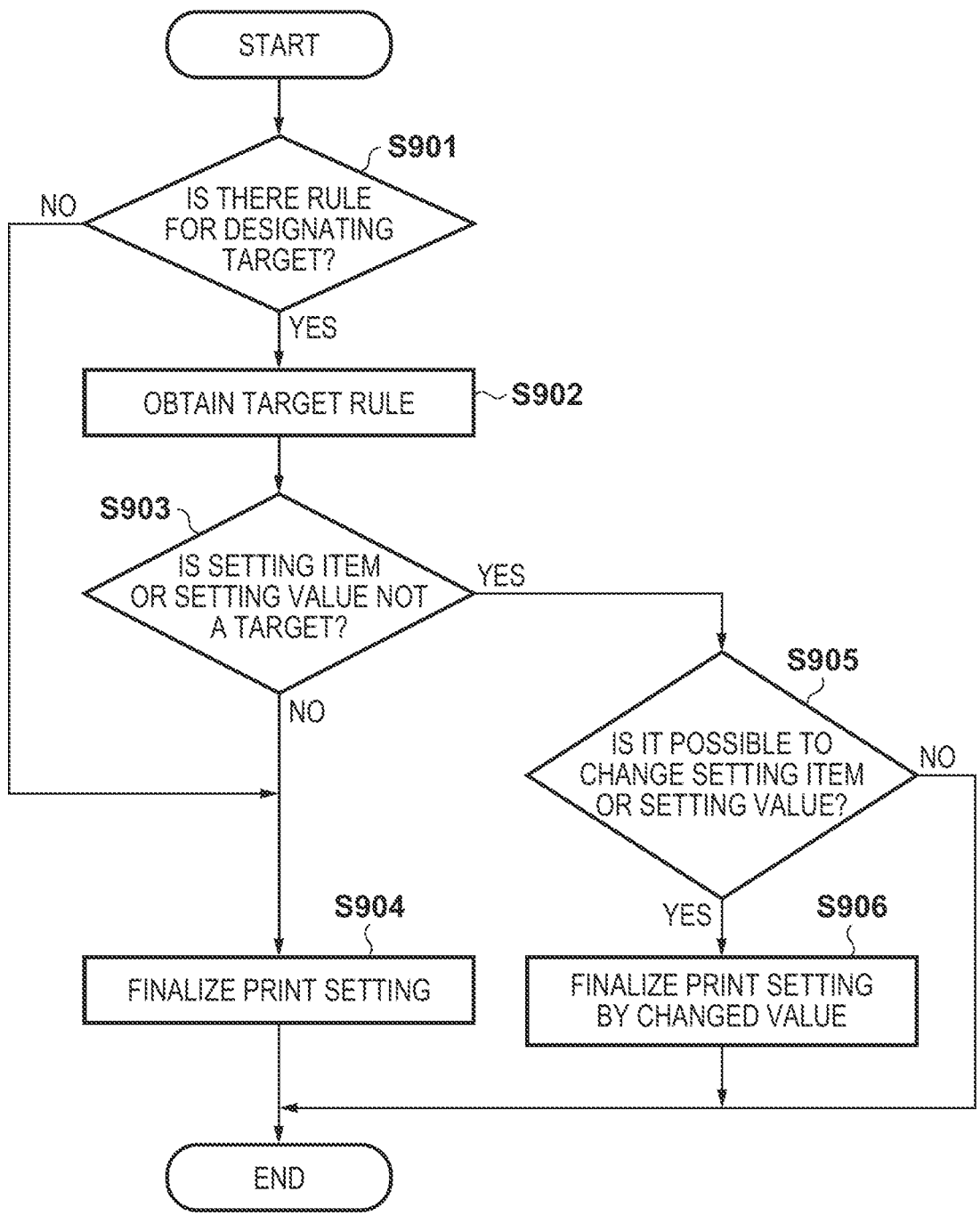
FIG. 9 is a flow diagram indicating application processing for a case where a setting target of a setting item or a setting value is designated, according to an embodiment.

Next, with reference to FIG. 9, description is given regarding a processing flow including application processing for designating a print setting of a setting target. Note that it is assumed that the processing flow in the present embodiment is executed by the configuration module 10531 of the printer driver 1053 unless otherwise specified. In addition, it is assumed that this processing flow is called before step S706 and after an operation inputted by a user is finalized in step S705, of FIG. 7.

Firstly, in step S901, it is confirmed whether there is a rule for designating a print setting that can be changed. If there is no print setting designation rule that can be changed (NO in step S901), the configuration module 10531 advances the processing to step S904, finalizes without changing the setting details in step S904, and the processing of FIG. 9 ends. If there is a rule for designating a print setting that can be set in step S901 (Yes in step S901), the configuration module 10531 advances the processing to step S902. In step S902, obtainment of the rule is performed. Specifically, in step S902, the configuration module 10531 reads a definition indicated by FIGS. 8A to 8C, and obtains information indicating which print setting (setting items and setting values) can be set. With the example of FIG. 8A, configuration may be taken to obtain a settable print setting from only data relating to designation of a print setting saved in the data holding unit 303. With the example of FIG. 8B, configuration may be taken to obtain a print setting that is a setting target from printing capability of a printer obtained from the printer capability obtainment unit 302 or the data holding unit 303, and data for designating a setting target of the print setting saved in the data holding unit 303.

Next, the configuration module 10531 advances the processing to step S903, and determines whether the setting value designated by the user operation is included in a settable print setting. If the setting value designated by user input is included in a setting target (i.e. can be set) (No in step S903), the configuration module 10531 advances the processing to step S904, and transitions to processing for finalizing the setting value designated by the input. Here, in the case of an amount of operation for designating a change of a plurality of levels by user input, a determination of whether being not included in a setting target is made in relation to setting items or setting values of all levels until a change is made. For example, in the case where only "9in1" is not a setting value that can be set, from out of "1in1", "2in1", "4in1", "6in1", and "9in1", consideration is given to a situation where input for increasing the number of aggregated pages three levels from "1in1" is received. In such a case, a determination regarding setting values for each of "2in1", "4in1", and "6in1" is made as to whether they are not included in a setting target, and because "6in1" which is a setting value that is not a setting target is included, it is determined that a setting value that is not a setting target is included.

If the value designated by user input is a value of a print setting that is not included in a setting target (Yes in step S903), the configuration module 10531 advances the processing to step S905 and rounds the value to thereby determine whether it is possible to change the setting value of the setting item of the print setting. For example, if input to increase the number of aggregated pages three levels from "1in1" described above is made, it is not possible to change the setting value to "6in1", but it is possible to round the number of levels to change from 3 to 2, and change the setting value after the change to "4in1". In this way, if it is possible to change the setting item or the setting value by rounding the value (Yes in step S905), the configuration module 10531 advances the processing to step S906, and finalizes the setting detail with the rounded setting value "4in1". For example, if input for increasing the number of aggregated pages by two levels from "4in1" is made, it is not possible to change the setting value to either "6in1" or "9in1", it is not possible to round the change. In this way, if it not possible to round the value and it is not possible to change the value of the print setting (No in step S905), the configuration module 10531 ends the processing of FIG. 9 without changing the print setting, and advances the processing to step S706.

Note that description is given by taking as an example a case where input for increasing the number of aggregated pages by three levels from "1in1" is made when "6in1" and "9in1" are excluded for a print setting that is a setting target and the four of "1in1", "2in1", "4in1", and "16in1" are setting targets. In such a case, "6in1" and the following "9in1" cannot be set (are not included in setting targets), but because it is possible to change to "16in1" by increasing the level further, the print setting may be finalized after changing the setting value to "16in1". In other words, in a case where an operation for increasing a predetermined setting value of a print setting is accepted, when it is possible to set the print setting if the setting value is increased by skipping setting values that are not included in setting targets, the print setting may be changed by skipping a setting value of the print setting that is not included in a setting target.

In the second embodiment as described above, it is possible to limit print settings that can be set, and it is possible to limit print setting that can be set by an operation corresponding to a direction component in the preview region. By this, it is possible to reduce an amount of operation for changing a print setting with a high frequency of use.

Third Embodiment

In the first and second embodiments, it is possible to change a print setting in accordance with an operation corresponding to a direction component in the preview region 401 of the print setting screen. However, because something where the wheel of a mouse rotates steplessly or something where a gesture operation such as a pinch is possible does not have feedback in accordance with a change for one level, it is possible that an input different to an operation intended by a user will be performed.

In the third embodiment, description is given of an example of an information processing apparatus that performs control for always changing by one level by one wheel operation. Note that the description of the same structure or processing as in the first and second embodiments will be omitted.

The present embodiment gathers a plurality of operations into one by, if operations corresponding to a direction component in the preview region are inputted, temporarily storing the details of a preceding operation, and if an operation similar to the preceding operation is successively performed within a predetermined amount of time, clearing the similar operation. In other words, if a plurality of operations corresponding to the same direction component are successively inputted, at least one operation is deactivated. If a separate operation is started, even if it is inputted within a short amount of time, because there ceases to be a single operation, it is assumed that the details of the preceding operation are cleared. A separate operation comprises an operation having a different direction component as with a reverse wheel operation, or an operation that does not have a direction component as with a click.

Note that, regarding the "details of the preceding operation", the event processing unit 304 of the printer driver 1053 performs an operation to obtain them from/save them in the data holding unit 303. It is assumed that, for the "details of the preceding operation" in the present embodiment, specifically information of a wheel orientation (enlargement or shrinking) or an amount of time over which the operation was performed is stored.

Figure 10:
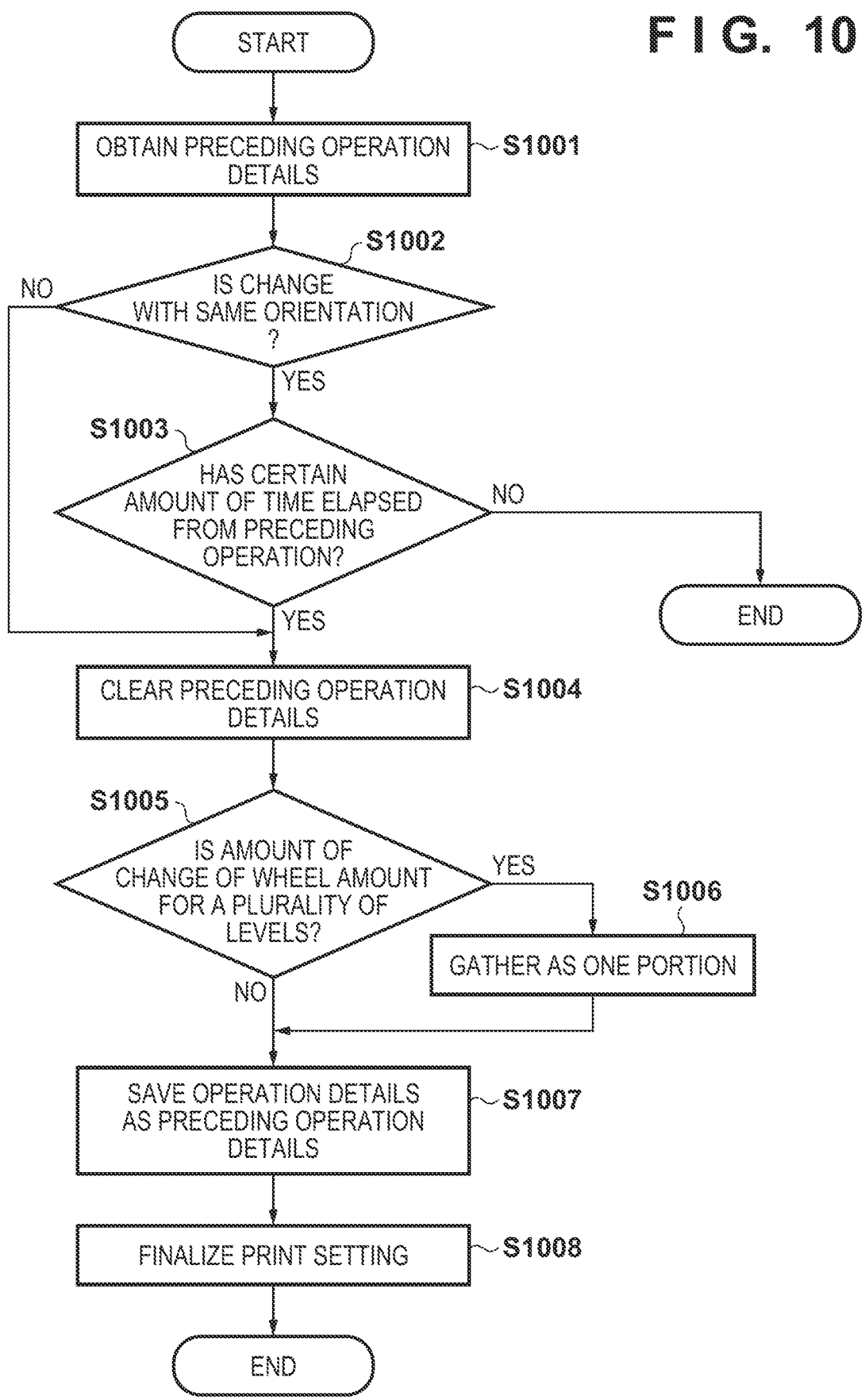
FIG. 10 is a flow diagram illustrating an example of processing for gathering an operation corresponding to a direction component in the preview region, according to an embodiment.

With reference to FIGS. 10 and 11, description is given regarding processing for gathering an amount of operation so that, if an amount of operation for two or more levels is inputted, it is made to be an operation for one level.

FIG. 10 is a flowchart that illustrates processing for gathering an amount of operation of an operation for instructing change of a print setting. This processing is assumed to be called directly before processing for finalizing a change of a print setting, such as after step S706 of FIG. 7 and before step S707, and after step S708 and before step S709. Note that it is assumed that this processing is executed by the configuration module 10531 of the printer driver 1053 unless otherwise specified.

Firstly, in step S1001, the configuration module 10531 obtains a "preceding operation", and advances the processing to step S1002. In step S1002, the configuration module 10531 determines whether an operation with respect to the same orientation has been performed. If the preceding operation and the current operation are the same type of operation and are operations for the same orientation (Yes in step S1002), a determination is made as to whether they are successive operations performed within a predetermined amount of time, and then the processing advances to step S1003. If the preceding and current operations are different operations or are operations with different orientations (No in step S1002), the configuration module 10531 determines that they are separate operations and advances the processing to step S1004.

In step S1003, the configuration module 10531 determines whether a certain amount of time has elapsed from the preceding operation, and, if it has elapsed (Yes in step S1003), transitions to step S1004 and continues processing after clearing the preceding operation. If the certain amount of time from the preceding operation has not elapsed in step S1003 (No in step S1003), being in the middle of one operation that is intermittently occurring is determined, and the processing of FIG. 10 ends. Note that the certain amount of time may be a fixed value that is hard-coded in advance, and may be a variable saved, in the data holding unit 303 or the like, in a format that can be customized by a user. Upon performing the processing of step S1004, the configuration module 10531 advances the processing to step S1005.

In step S1005, the configuration module 10531 determines whether an amount of operation of a wheel operation is for a plurality of levels. As described above, if an input operation in accordance with a wheel or the like that rotates steplessly is performed, an amount of operation for a plurality of levels can be detected for one operation. In this way, if an amount of operation for a plurality of levels is detected (Yes in step S1005), the configuration module 10531 advances the processing to step S1006, and makes a change from an operation for a plurality of levels to an operations for one level. Note that configuration may be taken such that, if wheel operations that are continuously performed within a predetermined amount of time are detected, and if there is an operation for a plurality of levels, treat the wheel operations successively performed as one wheel operation.

If an amount of operation for a plurality of levels is not detected (No in step S1005) or when the processing of step S1006 has ended, the configuration module 10531 advances the processing to step S1007, and saves finalized operation details as "preceding operation details" in the data holding unit 303.

Next, the configuration module 10531 advances the processing to step S1008, generates a print setting based on the finalized operation details, ends the processing of FIG. 10, and advances the processing to step S707 or step S709.

FIG. 11 is a flow diagram for illustrating processing for clearing the "preceding operation details" in the processing flow of FIG. 10. For example, if a series of operations such as "wheel"→"click"→"wheel" is performed inside a certain amount of time, it is necessary to clear the operation details in accordance with the click operation so that the above two wheel operations are not misrecognized as one wheel operation.

This processing can be called when ending a processing flow in accordance with the processing of step S702 and step S703 of FIG. 7. Alternatively, it may be called when performing processing to end (cancel) a processing flow in accordance with the operation of a specific key of a keyboard or interrupt processing from another input device. Note that it is assumed that this processing flow is executed by the configuration module 10531 of the printer driver 1053 unless otherwise specified.

Firstly, in step S1101, the configuration module 10531 determines whether there is operation details that should be cleared. For example, in the case of an operation such as a mouse movement (WM_MOUSEMOVE), it can be thought that a hand merely shook during a wheel operation, and thus is not an operation that should be cleared. If a current operation is an operation that should be cleared (Yes in step S1101), the configuration module 10531 advances the processing to step S1102 and performs processing to clear the "preceding operation details" saved in the data holding unit 303. If the current operation is not an operation that should be cleared (No in step S1101), the configuration module 10531 ends the processing of FIG. 11 without clearing the preceding operation details. In an example, when the processing of FIG. 11 ends, the processing proceeds to step S715 or step S713 of FIG. 7.

In the third embodiment as described above, controls is performed to always have change for one level with one wheel operation. By this, because change of a print setting is performed in accordance with the type or direction of an operation and not an amount of change of the operation, it is possible to prevent an excessive change of the print setting exceeding a user's expectations, even if an amount of change of two or more levels has been inputted.

Fourth Embodiment

In the first through third embodiments, it is possible to change a print setting in accordance with an operation corresponding to a direction component in the preview region 401 of the print setting screen. In an example, it is desirable to seamlessly switch between a plurality of setting items, such as with a poster and page aggregation. For example, if an input form such as select boxes for changing setting values of each setting item are separated into different dialogs or tabs, an excessive operation such as switching screens one by one is necessary. In such a case, if an operation corresponding to a direction component in the preview region 401 is inputted for a predetermined amount or more, by seamlessly switching between a plurality of setting items, it is possible to reduce effort for performing excessive mouse movements, and improve convenience for a user.

In the fourth embodiment, description is given for an example of an information processing apparatus for improving accessibility of a UI by changing a plurality of setting items included in a print setting, in accordance with an operation corresponding to a direction component in the preview region. Note that the description of the same structure or processing as in the first embodiment will be omitted.

With FIG. 12, description is given for an example of a print setting for which a change in accordance with an operation corresponding to a direction component in the preview region is possible. In the first embodiment, it is possible to change only a setting value for one setting item (N-in-one printing), as in FIG. 6. In the fourth embodiment, by performing a wheel-up operation in a state for "1in1" as in FIG. 12, it is possible to change the setting item to the poster print and change to a setting value such as "1×2" and "2×2". In other words, in accordance with a wheel operation that has an amount of change greater than or equal to a predetermined level, it is possible to change a setting item to another setting item instead of just changing a setting value of the setting item.

Next, with reference to FIGS. 13A and 13B, description is given for details of a definition for designating a print setting that can be set. FIG. 13A is an example of a definition in an XML format for designating a plurality of setting items (N-in-one printing 1301 and a poster print 1302) that can be set. For the N-in-one printing 1301, "16in1", "9in2", "6in1", "4in1", "2in2", and "1in1" are designated as settable setting values. For the poster print 1302, "1×2", "2×2", "3×3", and "4×4" are designated as settable setting values.

Here, because the "1in1" of the N-in-one printing 1301 and the "1×1" of the poster print 1302 are the same setting, a setting value for "1×1" of the poster print 1302 is omitted in the example of FIG. 13A so that two settings that are the same are not present duplicatively. Note that, in the present embodiment, a default value for a setting value for each of the N-in-one printing 1301 and the poster print 1302 is not recorded because it is in accordance with a setting of the printer driver 1053, but a record therefor may be added to the definitions of the settings of FIGS. 13A and 13B.

FIG. 13B is an example of a definition in an XML format for making a designation regarding a print setting in more detail than that of FIG. 13A. A detailed print setting 1303 is a record for N-in-one printing (PagesPerSheet), but designation is also given here for setting items that need to be set in accordance with a case of changing to "1in1". In other words it is assumed that, if N-in-one printing is changed to "1in1", change is also made to the other setting items.

Firstly, the second line of the detailed print setting 1303 is a record for switching the setting item "printing orientation (PageOrientation)" to fit in a sheet when switching a number of pages that are aggregated. In addition, the third line of the detailed print setting 1303 indicates that the setting value "1in1" of the setting item "N-in-one printing" substantially means the same thing as the setting value "1×1 (Poster 1×1)" of the setting item "poster print (PagePosterPrint)".

Note that, for a case of "2in1", it is necessary to rotate a sheet by designating the "landscape" orientation for the orientation of printing, as illustrated by FIG. 12, but, for a case where an original orientation of printing is the "landscape" orientation, it is necessary to set the orientation of printing to "portrait" in the case of "2in1". In this way, a case where a setting value differs depending on an original print setting, may be handled by making a record that diverges from definition of the print setting 1303, with respect to a condition for the original print setting.

By reading these print settings, it becomes possible to switch between a plurality of setting items as with a normal wheel operation, but a problem occurs at a boundary portion for switching between N-in-one printing and poster print. Because N-in-one printing and poster print are different setting items, each has different conflict relationships. In other words, if "duplex printing" which is in a conflict relationship and has a higher priority than poster print is already set, it is not possible to switch from N-in-one printing to poster print because duplex printing has higher priority. In addition, if "staple" which is in a conflict relationship and has a lower priority than poster print is already set, because poster print has higher priority, the "staple" setting is deactivated the instant poster print is switched to. Accordingly, after this setting is cancelled by mistakenly performing a wheel operation to change from N-in-one printing to the poster print, when changing the setting item to N-in-one printing again, it is necessary to activate the "staple" setting which was included in the original print setting.

Figure 14:
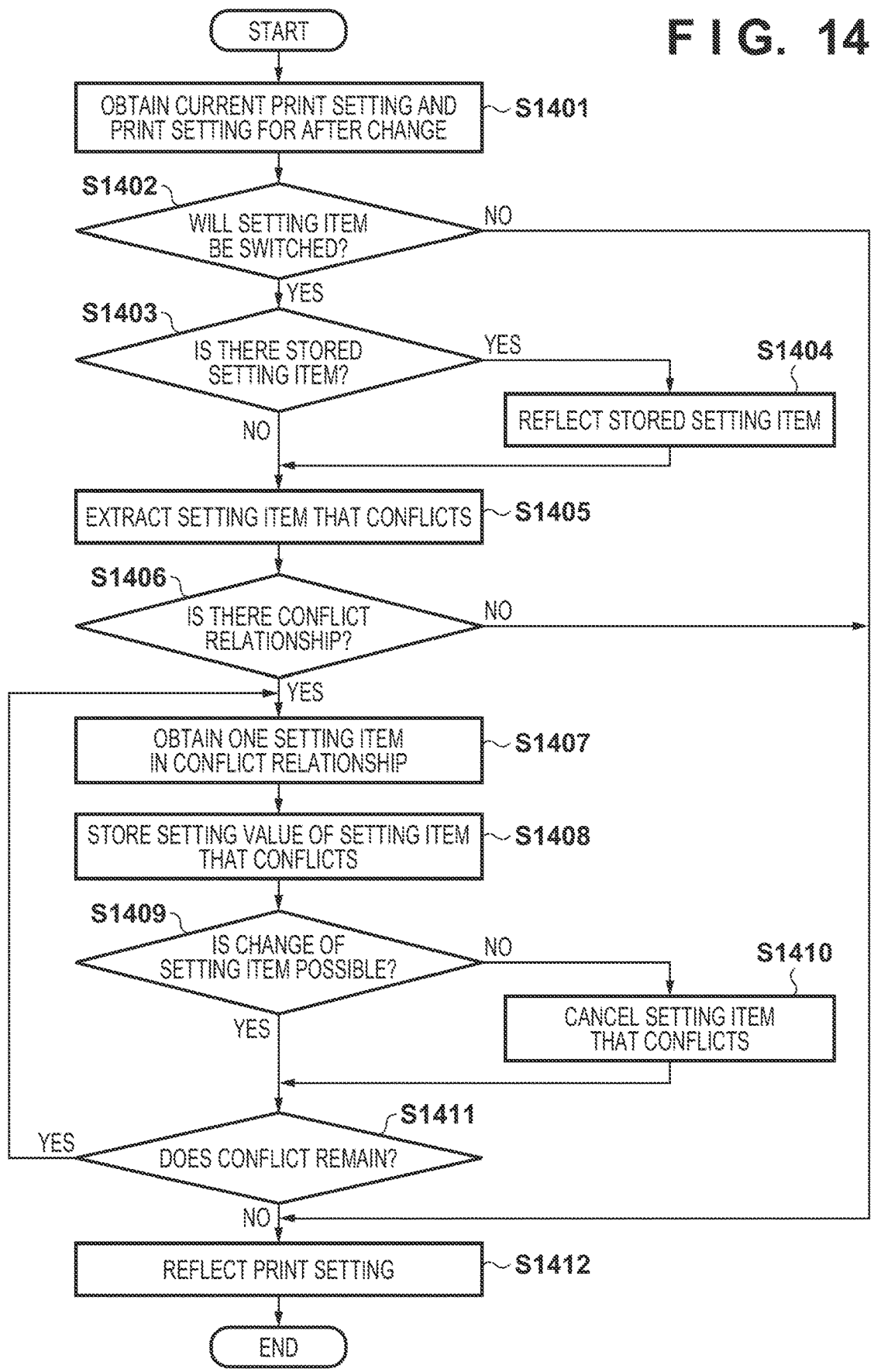
FIG. 14 is a flowchart illustrating an example of processing for changing a setting item or a setting value in accordance with an operation corresponding to a direction component in a preview region, according to the embodiment.

FIG. 14 is a processing flow illustrating processing for, in order to handle a problem that a related setting item is arbitrarily canceled when switching between different types of print settings as described above, storing and canceling a parameter of a setting item that is in a conflict relationship when switching the setting item. By this, it is possible to restore a setting item that has been canceled due to being in a conflict relationship, in a case of returning to a setting item that does not have a conflict relationship. Note that this processing flow is assumed to be called instead of processing for finalizing a print setting or directly before processing for applying a change, such as after step S706 of FIG. 7 and before step S707, and after step S708 and before step S709. In addition, it is assumed that this processing flow is executed by the configuration module 10531 of the printer driver 1053 unless otherwise specified.

Firstly, in step S1401, a current print setting and a print setting for after a change are obtained by the configuration module 10531. For example, when changing a setting value for N-in-one printing from "2in1" to "1in1", the current print setting is "2in1" and the print setting for after the change is "1in1".

Next, the configuration module 10531 advances the processing to step S1402, and determines, from the current print setting and the print setting for after the change obtained in step S1401, whether a related setting item is to be switched. For example, it is determined whether there is a switch from "1in1" to N-in-one printing or poster print, or a switch from N-in-one printing or the poster print to "1in1". In other words, a determination is made as to whether a switch of a setting item will occur, and whether a switch of a related setting item will occur. If a setting item will be switched (Yes in step S1402), the configuration module 10531 advances the processing to step S1403. If a setting item will not be switched, the configuration module 10531 advances the processing to step S1412.

In step S1403, the configuration module 10531 determines whether there is a stored parameter of a setting item that was saved in step S1408 which is described later. This indicates a parameter of a setting item with a high priority that is in a conflict relationship and is canceled in step S1410, and parameter of a setting item that has a low priority and is canceled when a change of a print setting is performed in step S1412. Here, a parameter of a setting item may be the setting item, and may be a combination of the setting item and a setting value thereof. If there is a stored parameter of the setting item (Yes in step S1403), the configuration module 10531 advances the processing to step S1404, and if there is no stored print setting (No in step S1403), the configuration module 10531 advances the processing to step S1405.

Step S1404 indicates processing for, if there is a stored print setting, reflecting that. For example, if the setting item is changed from "N-in-one printing" accompanied by a staple setting to "poster print" which has a higher priority than the staple setting and is in a conflict relationship with the staple setting, the configuration module 10531 stores a parameter for the staple setting. Next, if the setting item is changed, the configuration module 10531 reads the stored "staple" setting, and causes the current print setting to reflect the staple setting. When the processing of step S1404 ends, the configuration module 10531 advances the processing to step S1405.

In step S1405, the configuration module 10531 extracts the setting item after the change and the setting item in the conflict relationship. For example, in a case of switching to "poster print", the "staple" described above is in a conflict relationship. Note that a conflicting setting extracted by the processing of step S1405 may be a conflicting setting that the printer driver 1053 independently defines and saves by the data holding unit 303 or the like, and may be a reference to a conflicting setting held by the OS. When the processing of step S1405 ends, the configuration module 10531 advances the processing to step S1406.

In step S1406, the configuration module 10531 determines whether there is a conflict for a plurality of print settings. In the present example, because "poster print" and the "staple" setting are in a conflict relationship (Yes in step S1406), the processing advances to step S1407. If there is no conflict (No in step S1406), the configuration module 10531 advances the processing to step S1412, and reflects the change to the print setting.

In step S1407, the configuration module 10531 obtains one setting item that is in a conflict relationship with the "poster print" after the change, and advances the processing to step S1408. Here, it is assumed that the print setting for "staple" is obtained as an example. In step S1408, the configuration module 10531 stores the setting item in conflict, and advances the processing to step S1409. In the present example, information indicating the setting item "staple" and the setting value "top left" are saved in the data holding unit 303.

In step S1409, it is determined whether it is possible to change to the setting item after change. Here, it is determined whether a change of the setting item from N-in-one printing to poster print is possible. If it is not possible to change to the setting item for after the change (No in step S1409), the configuration module 10531 advances the processing to step S1410, and cancels the setting item in the conflict relationship. If it is possible to change to the setting item for after the change (Yes in step S1409), the configuration module 10531 advances the processing to step S1411. In the present example, because "poster print" has higher priority than "staple", it is determined that a change to the setting item for after the change is possible, and the configuration module 10531 advances the processing to step S1411. In another example, for a change from N-in-one printing which is accompanied by "duplex printing" to a poster print, because the priority of "duplex printing" is higher than that of poster print, it is not possible to change the setting item to poster print. Accordingly, step S1410 is transitioned to, "duplex setting" which is in conflict is canceled, and the processing advances to step S1411.

In step S1411, it is determined whether another conflict remains. If a conflict remains (Yes in step S1411), the configuration module 10531 returns the processing to step S1407, and performs similar processing in relation to a remaining conflict. If no conflict remains (No in step S1411), the configuration module 10531 advances the processing to step S1412.

Finally, in step S1412, the configuration module 10531 generates the print setting for after the change, and reflects it. Here, a setting item that is in a conflict relationship and has a lower priority than the setting item for after the change is canceled. When the processing of FIG. 14 ends, the configuration module 10531 returns the processing to step S707 or step S709.

As described above, an information processing apparatus according to the third embodiment can change a plurality of types of print settings in accordance with an operation corresponding to a direction component in the preview region. In addition, in a case of changing to a print setting of a different type, it is possible to store/restore a related print setting that is canceled in conjunction with a change of the type of print setting, when a conflict for a setting relating to each print setting is resolved. By this, by seamlessly switching between print settings of a plurality of types in accordance with an operation corresponding to a direction component in the preview region, it is possible to reduce effort of performing excessive mouse movements and improve convenience for a user.

Other Embodiments

It is possible to freely combine the above first to fourth embodiments. For example, an information processing apparatus can change a print setting in accordance with a type of an operation according to the third embodiment, and can have print settings of a plurality of types according to a fourth embodiment.

Figure 15:
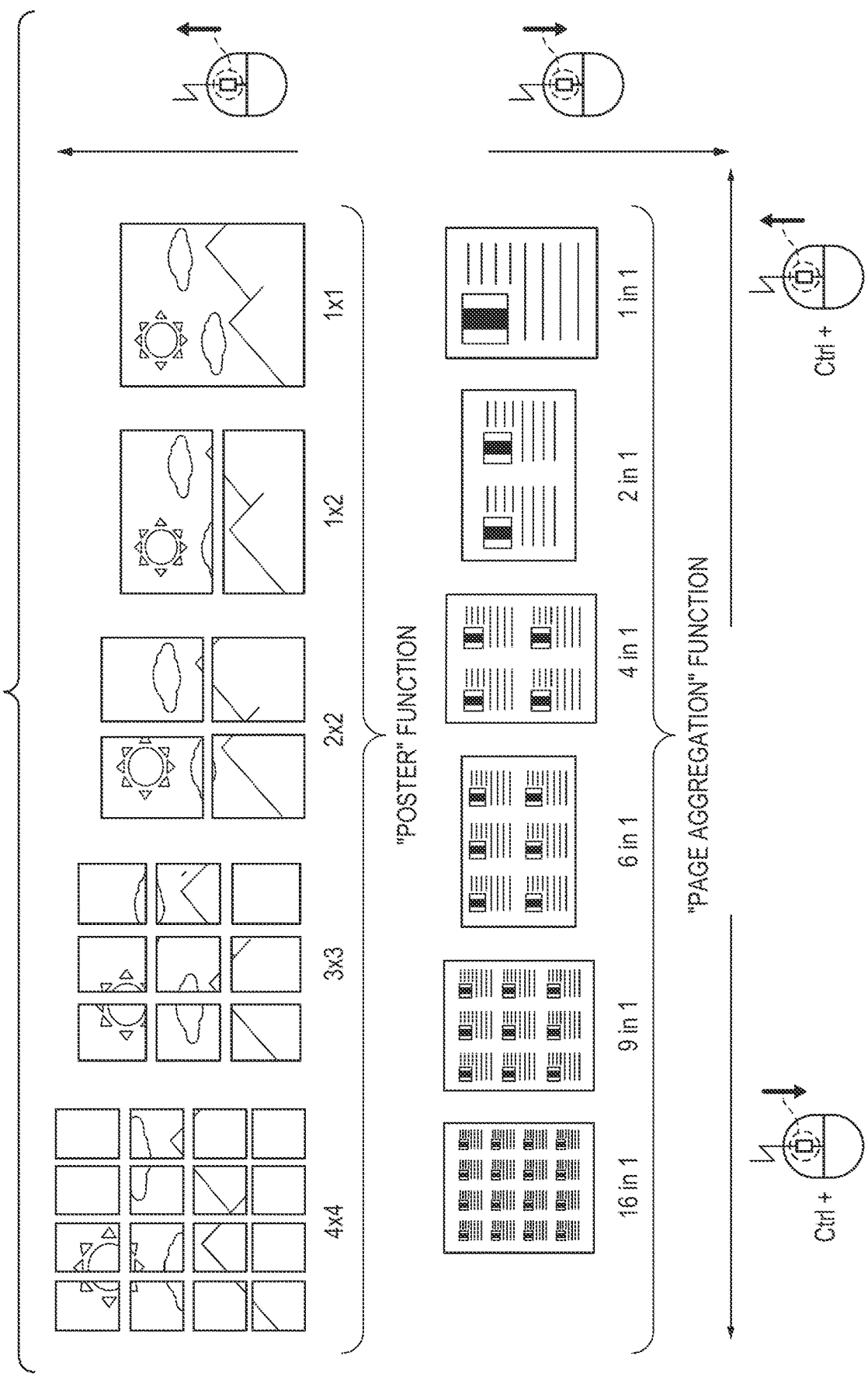
FIG. 15 is a view illustrating an example of a plurality of setting items and a plurality of setting values that can be changed in accordance with a plurality of types of operations corresponding to a direction component in a preview region, according to the embodiment.

In addition, in the present embodiment, an operation corresponding to a direction component in the preview region for changing a print setting was described as a wheel operation or a pinch operation, but a print setting can be set by a plurality of methods in accordance with an operation corresponding to a plurality of direction components. For example, as illustrated by FIG. 15, configuration may be such that a wheel operation enables a change from a poster print to N-in-one printing, and a setting value for N-in-one printing is changed by performing a wheel operation while a control key (Ctrl) is pressed. Thereby it is possible to switch a print setting multi-dimensionally, and improve convenience for a user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-120041, filed Jun. 25, 2018, which is hereby incorporated by reference herein in its entirety.

What is claimed is:

1. An information processing apparatus comprising:
a controller including a memory and a processor, the controller configured to function as:
a first setting unit configured to set a number of pages to be printed on one sheet;
a first determination unit configured to determine whether an object has moved in a first direction or moved in a second direction that is a reverse direction to the first direction;
a second setting unit configured to, if the first determination unit determines that the object has moved in the first direction, increase the set number of pages, and if the first determination unit determines that the object has moved in the second direction, decrease the set number of pages;
a second determination unit configured to determine whether the number of pages set by the second setting unit conflicts with another print setting; and
a change unit configured to change the another print setting based on determination that the number of pages set by the second setting unit conflicts with the another print setting,
wherein a range of a number of pages that can be selected in a case where the number of pages is set by the second setting unit based on an operation using a pull-down menu is wider in comparison to a case where the number of pages is set by the second setting unit based on the movement of the object.

2. The information processing apparatus according to claim 1, wherein the object is a mouse wheel or a finger.

3. The information processing apparatus according to claim 1, wherein the movement of the object is a rotation of a mouse wheel.

4. The information processing apparatus according to claim 1, wherein movement in the first direction of the object is a pinching-in operation, and movement in the second direction of the object is a pinch-out operation.

5. The information processing apparatus according to claim 1,
wherein the object is a mouse wheel, and
wherein the first determination unit is further configured to determine whether the mouse wheel has moved in the first direction or moved in the second direction while a cursor is on a preview area that illustrates print settings.

6. A method of controlling an information processing apparatus, the method comprising:
setting a number of pages to be printed on one sheet;
determining whether an object has moved in a first direction or moved in a second direction that is a reverse direction to the first direction;
changing, if the set number of pages to be printed on one sheet is one and it is determined that the object has moved in the first direction, the set number of pages to two, and if the set number of pages to be printed on one sheet is two and it is determined that the object has moved in the second direction, the set number of pages to one;
determining whether the number of pages set by the changing conflicts with another print setting; and
changing the another print setting based on the determination that the number of pages set by the changing conflicts with the another print setting,
wherein a range of a number of pages that can be selected in a case where the number of pages is set based on an operation using a pull-down menu is wider in comparison to a case where the number of pages is set based on the movement of the object.

7. The method according to claim 6, wherein the object is a mouse wheel or a finger.

8. The method according to claim 6, wherein the movement of the object is a rotation of a mouse wheel.

9. The method according to claim 6, wherein movement in the first direction of the object is a pinching-in operation, and movement in the second direction of the object is a pinch-out operation.

10. An information processing apparatus comprising:
a controller including a processor and a memory, the controller configured to:
set a number of pages to be printed on a surface of one sheet;
cause a display to display the number in a first print setting area and a figure that represents the number in a second print setting area,
wherein the number is changed based on a user operation received while the first print setting area is selected, and is changed based on a user operation for moving an object received while the second print setting area is selected, wherein the number is increased based on the movement of the object in a first direction, and the number is decreased based on the movement of the object in a second direction that is opposite from the first direction,
wherein a range of a number of pages that is settable in a case where the number is changed based on the operation received while the first print setting area is selected is wider in comparison to a case where the number is changed based on the operation received while the second print setting area is selected.

11. The information processing apparatus according to claim 10, wherein the object is a mouse wheel.

12. The information processing apparatus according to claim 11, wherein the first print setting area includes a pull down menu that allows a user to select a number, and the selected number is set as the number of pages to be printed on the surface of the one sheet.

\* \* \* \* \*